United States Patent [19]

Farooque et al.

[11] Patent Number: 5,175,062
[45] Date of Patent: Dec. 29, 1992

[54] REFORMING UNIT FOR FUEL CELL STACK

[75] Inventors: Mohammad Farooque, Huntington; Matt Lambrech, Sherman; Jeffrey Allen, Woodbury, all of Conn.

[73] Assignee: Energy Research Corporation, Danbury, Conn.

[21] Appl. No.: 647,728

[22] Filed: Jan. 30, 1991

[51] Int. Cl.[5] .......................................... H01M 8/04
[52] U.S. Cl. ........................................ 429/20; 429/36
[58] Field of Search ................. 429/36, 37, 69, 20

[56] References Cited

U.S. PATENT DOCUMENTS

| 3,488,226 | 1/1970 | Baker et al. | 136/86 |
|---|---|---|---|
| 4,365,007 | 12/1982 | Mura et al. | 429/19 |
| 4,514,475 | 4/1985 | Mientek | 429/37 X |
| 4,604,331 | 8/1986 | Louis | 429/37 X |
| 4,609,595 | 9/1986 | Nickols | 429/37 X |
| 4,618,543 | 10/1986 | Matsumura et al. | 429/19 |
| 4,689,280 | 8/1987 | Gionfriddo | 429/34 |
| 4,877,693 | 10/1989 | Baker et al. | 429/20 |
| 4,983,470 | 1/1991 | Kimura et al. | 429/19 X |

Primary Examiner—Stephen Kalafut
Attorney, Agent, or Firm—Robin, Blecker, Daley & Driscoll

[57] ABSTRACT

A reforming unit assembly for reforming hydrocarbon fuel for the molten carbonate fuel cells of a fuel cell stack wherein the reforming unit comprises a housing and an integrating unit for integrating the housing with the adjacent fuel cells in the stacks.

22 Claims, 6 Drawing Sheets

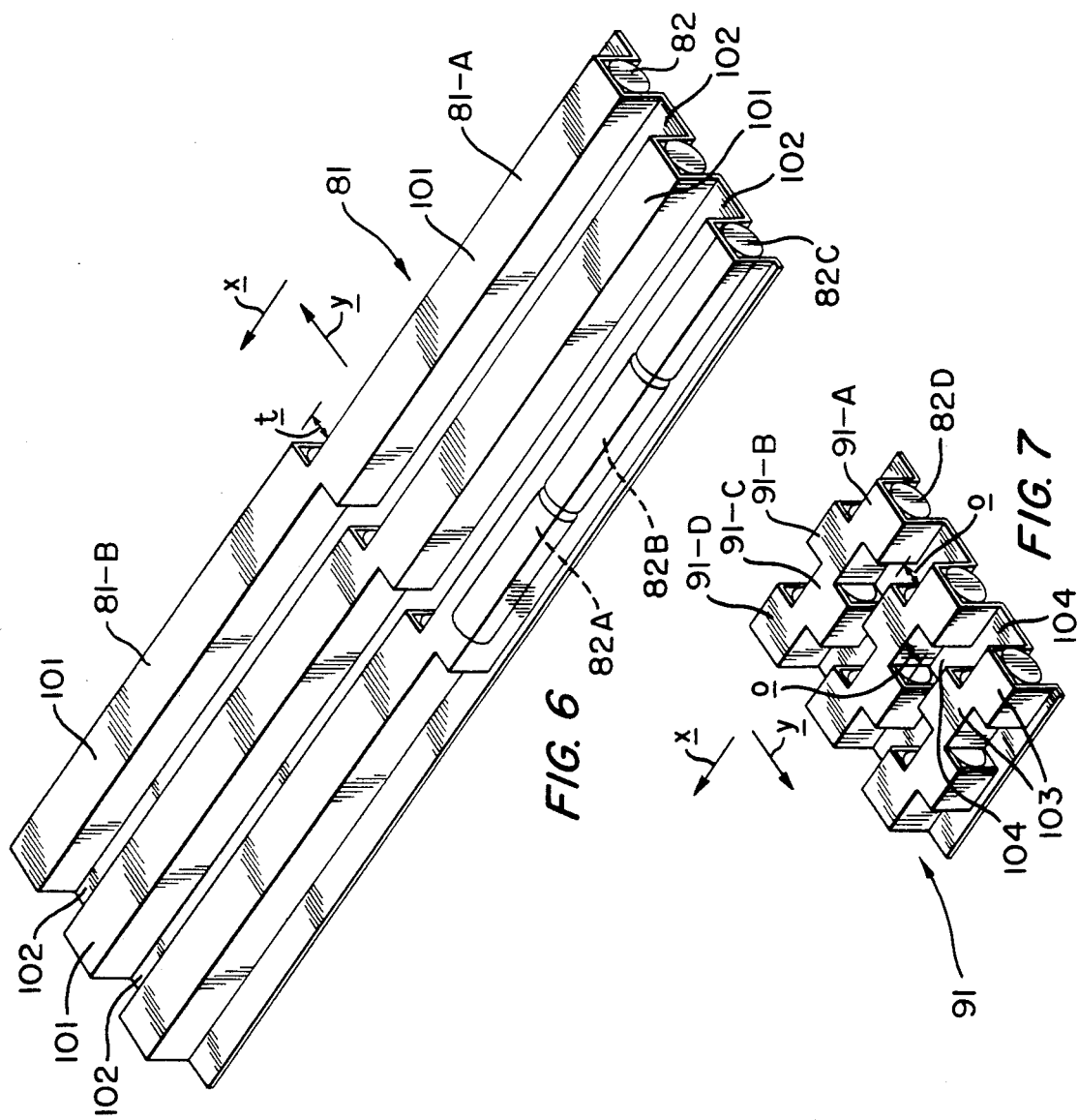

REFORMING UNIT FOR FUEL CELL STACK

DETAILED DESCRIPTION

This invention relates to a reforming unit assembly and, in particular, to a reforming unit assembly adapted for use with fuel cells arranged in a stack.

In the design of fuel cell systems and, in particular, high temperature fuel cell systems such as, for example, molten carbonate fuel cell systems, there has been proposed a number of designs in which fuel process gas for the fuel cell stack is derived by reforming hydrocarbon fuel internally of the stack. In these types of designs, the hydrocarbon fuel feed is internally converted to useable hydrogen and carbon monoxide utilizing heat produced by the reactions in the fuel cells of the stack directly, thus reducing the heat exchange duty of the system. Also, water produced in the reactions in the fuel cells can be used in the reforming reaction reducing the water feed requirement.

In the internally reforming fuel cell system described in U.S. Pat. No. 3,488,226, catalyst is placed in the anode compartment of each fuel cell, directly in communication with the cell electrolyte. One major drawback of this configuration is that the reforming catalyst is likely to be deactivated due to electrolyte pickup which results from vapor phase absorption and/or liquid film creepage. In addition to catalyst deactivation, electrolyte loss to the catalyst itself creates difficulties in terms of cell electrolyte management.

An alternative type of system is described in U.S. Pat. No. 4,877,693, assigned to the same assignee hereof. In this type of system, the bulk of the reforming is carried out indirectly by internally reforming the fuel in reforming compartments or units placed in between fuel cell groups in the stack. A group of cells typically might comprise five to eight fuel cells.

The reforming compartments or units used in the stack of the '693 patent are in thermal communication with the cells, so that the reforming reaction is able to draw the necessary heat from adjacent cells. However, the catalyst in the compartments is isolated from the cells and, hence, not subject to electrolyte deactivation. This indirect internal reforming provides equilibrium conversion of the hydrocarbon fuel.

As can be appreciated, the reforming compartments or units used in the '693 patent are required to meet many functional and structural requirements. A few of these requirements are listed below:

1. The reforming unit assemblies must be mechanically integrated with the adjacent cells of the stack. This requires that the following be considered: compressive force distribution, electrical continuity, process gas tightness both in plane and through plane, fuel feed and exhaust adaption and adaptation to single cells on either side.
2. The reforming unit assemblies must be thermally integrated with the adjacent cells of the stack. This means, amongst other things, that there must be sufficient heat transfer area to accommodate transfer of required heat from adjacent cells to the fuel being reformed without causing a large thermal gradient through the reforming unit.
3. The reforming unit assemblies must be electrically integrated with adjacent cells. This necessitates that there be a flow of electricity between cells on either side of the unit with negligible voltage drop.
4. The reforming unit assemblies must be capable of supporting the reforming reaction, while providing high fuel conversion (approaching equilibrium) and low pressure drop.
5. The reforming unit assemblies must be able to support the hydrocarbon fuel feed arrangement, while maintaining electrical isolation between the different reforming units.
6. The reforming unit assemblies must be able to maintain material stability in the fuel cell environment.

The design of suitable reforming unit assemblies to meet the above requirements has been an ongoing task. While various designs have been proposed, there is still a need for improvement.

It is, therefore, an object of the present invention to provide an improved reforming unit assembly for use in a fuel cell stack.

It is a further object of the present invention to provide a reforming unit assembly which is designed such that it can be integrated into a fuel cell stack so as to promote a uniform heat profile while realizing maximum reforming action.

SUMMARY OF THE INVENTION

In accordance with the principles of the present invention the above and other objectives are realized in a reforming unit assembly which includes a housing having an inlet and an outlet and a catalyst within the housing to cause the hydrocarbon fuel to be reformed as it traverses the path from the inlet to the outlet.

Means is further provided in the assembly for integrating the reforming unit housing with its adjacent fuel cells in the fuel cell stack. This means comprises a plate having opposing first sides each of which is bent outwardly of the plane of the plate to accomodate the extent of the height of the housing and the height of an anode side rail disposed on the housing. These first sides of the plate are also further bent inwardly toward the center of the plate so as to overly their respective anode side rails which border the anode components of an adjacent fuel cell.

The plate of the integrating means also includes opposing second sides which are bent outwardly of the plane of the plate in the opposite direction to the first sides. These second sides, in turn, accomodate the height of cathode side rails which abut the plate and between which the cathode components of an adjacent fuel cell are disposed. The second sides are also bent inwardly toward the center of the plate so as to overlap their respective cathode side rails.

The reforming unit housing is further adapted such that the hydrocarbon fuel passes through the housing in a generally U-shaped path and is prevented from passing through the housing in a confined volume. Means are also provided within the housing for promoting electrical conductivity and physical support.

Catalyst is further distributed in the housing so as to be situated exteriorly of preselected areas of the housing, e.g. areas in the immediate vicinity of the inlet and areas adjacent the coolant gas inlets of adjacent fuel cells. Means is also provided at the exterior of the outlet of the housing for preventing catalyst dust from blowing into the adjacent fuel cells.

BRIEF DESCRIPTION OF THE DRAWINGS

The above and other features and aspects of the present invention will become more apparent upon reading the following detailed description in conjunction with the accompanying drawings, in which:

FIGS. 6 and 7 illustrate two versions of plate structure and catalyst which can be used in the interior of the reforming unit assembly of FIG. 2.

DETAILED DESCRIPTION

Figure 1:
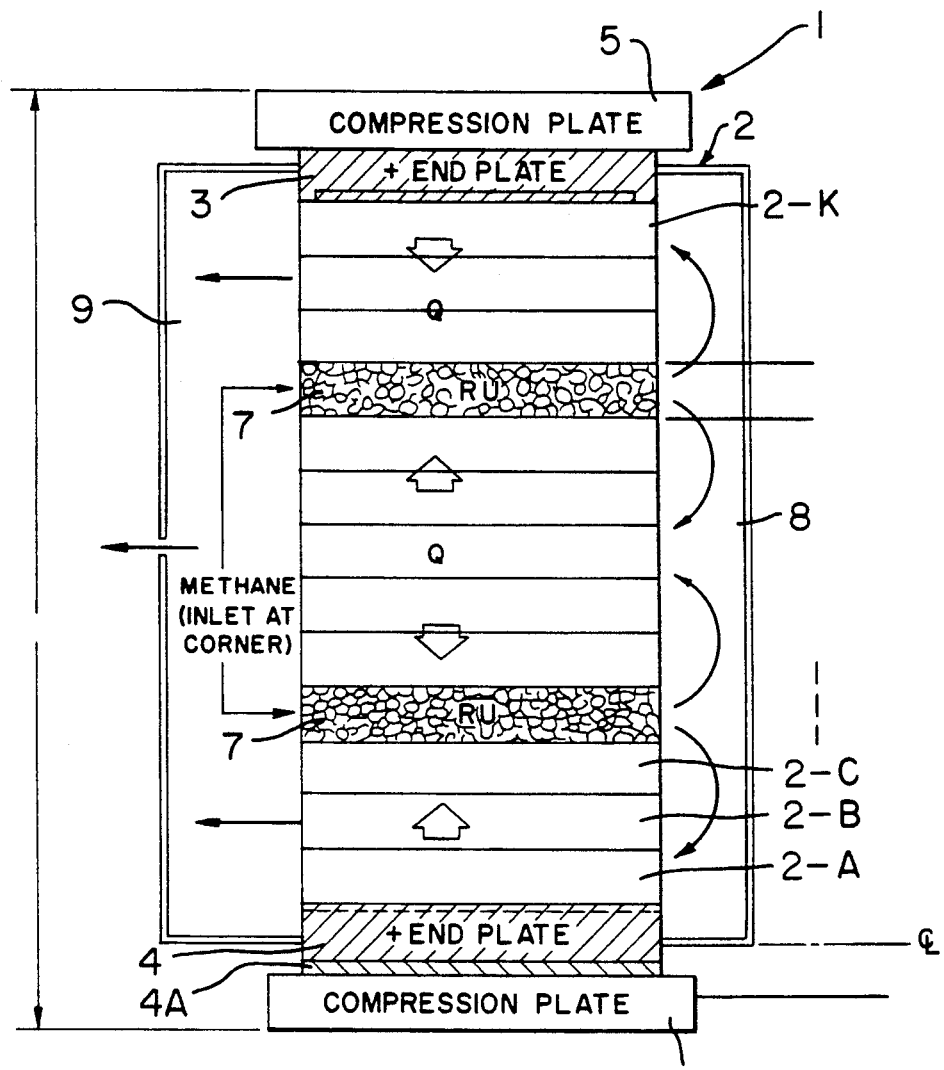
FIG. 1 shows schematically a fuel cell stack incorporating reforming unit assemblies in accordance with the principles of the present invention.

FIG. 1 shows schematically, a fuel cell system 1 comprising a fuel cell stack 2. The fuel cell stack 2 includes individual fuel cells 2-A-2-K which are stacked one on the other.

Adjacent the top and bottom fuel cells 2-A-2-K are respective ends plates 3 and 4. The stack of cells and end plates are held together and compressed by further compression plates 5 and 6 which abut the end plates 3 and 4, respectively. Dielectric insulation 4A is provided between the lower end plate 4 and its compression plate 6.

Also situated in the stack 2 between sets of the fuel cells are like reforming unit assemblies 7. These reforming unit assemblies receive hydrocarbon fuel or feedstock (shown as methane) and reform the fuel to produce hydrogen fuel process gas which exits the reforming unit assemblies into a manifold 8. The latter manifold directs the process gas back through the anode compartments of the fuel cells 2-A-2-K. In the fuel cells, the fuel process gas undergoes electrochemical conversion with oxidant process gas supplied to the cathode compartments of the cells. Excess fuel and exhaust gases then pass from the anode compartments into an exit manifold 9 for departure from the stack.

Figure 2:
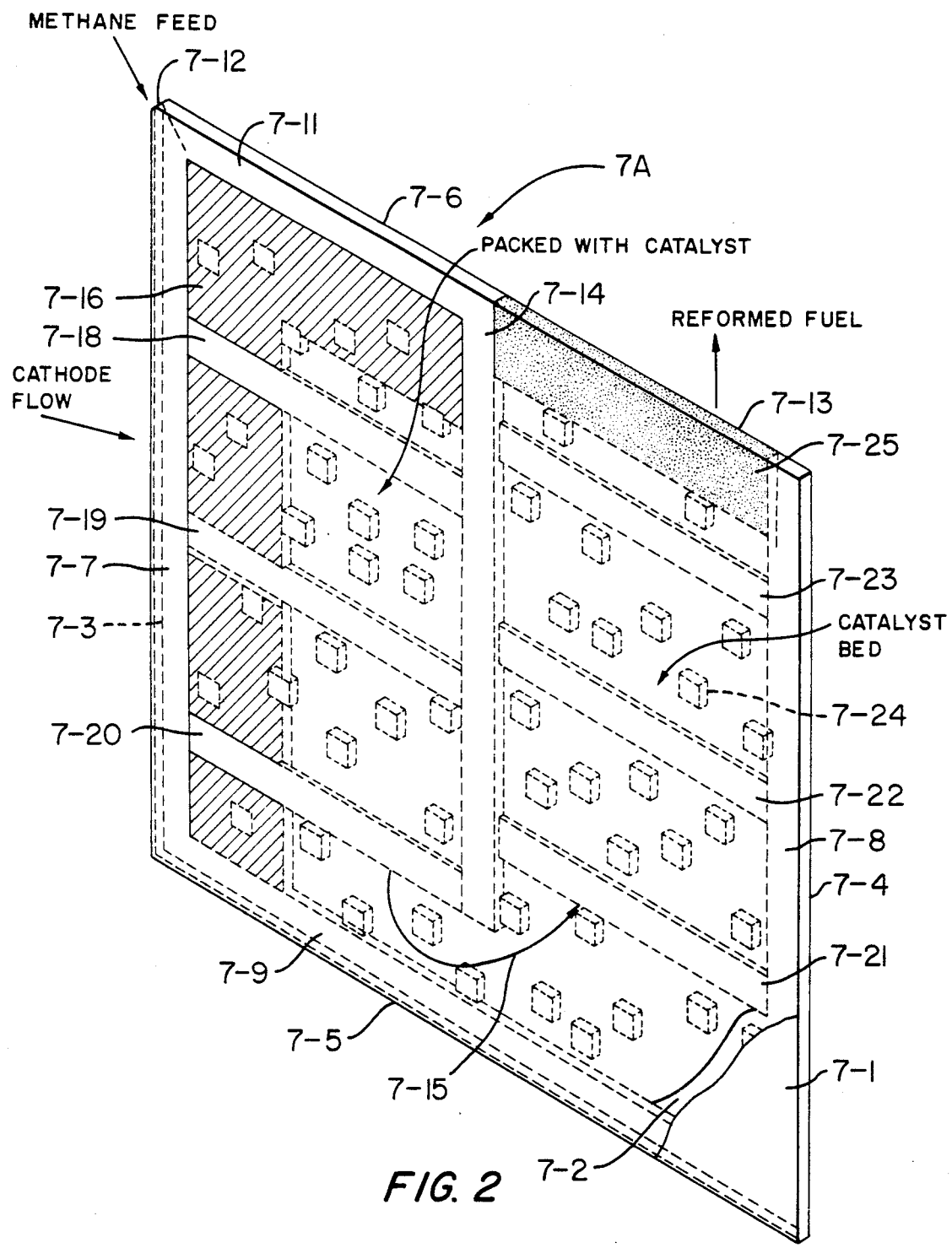
FIG. 2 illustrates the details of a housing of a reforming unit assembly used in the stack of FIG. 1.

FIG. 2 shows an illustrative embodiment of a housing 7A of one of the reforming unit assemblies 7 in greater detail. As shown, the housing 7A comprises opposing upper and lower rectangular plates 7-1 and 7-2 which define a first set of opposing sides 7-3 and 7-4 and a second set of opposing sides 7-5 and 7-6 for the unit. Edge members 7-7, 7-8 and 7-9 extend along the lengths of the sides 7-3, 7-4 and 7-5 and an edge member 7-11 extends along a portion of the length of the side 7-6 of the unit. This leaves along the remaining portion of the side 7-6, an opening into the interior of the housing 7A defining a outlet 7-13 for the housing. A further opening into the interior of the housing is provided at the corner where the edge members 7-7 and 7-11 abut. This opening defines an inlet 7-12 for the housing 7A.

In accord with the invention, the reforming unit housing 7A is further provided with means within the unit for defining a flow path, shown as U-shaped in the present example, for the hydrocarbon fuel and resultant process gas from the inlet 7-12 to the outlet 7-13. In the present illustrative case, this is accomplished by providing in the housing 7A a baffle 7-14. The latter baffle extends from the end of the edge member 7-11 adjacent the outlet 7-13 across the interior of the unit 7 and terminates short of the opposing edge member 7-9. As can be appreciated, by selecting the height of the baffle 7-14 so that the baffle abuts the top and bottom plates 7-1, 7-2, the presence of the baffle forces hydrocarbon fuel introduced at the inlet 7-12 and fuel process gas developed from reforming of the fuel to generally follow U-shaped path 7-15 as the fuel and resultant process gas pass through the reforming unit to the outlet 7-13.

In further accord with the invention, the reforming unit housing 7A is also adapted so that catalyst is disposed only in preselected areas of the housing and is also prevented from being carried from the housing. Thus, as shown, the regions immediately adjacent the fuel inlet 7-12 and the sides 7-3 and 7-6 of the unit are packed with an inert material 7-16 so as to preclude catalyst in these areas. The catalyst in the housing 7A is thus confined to the unpacked generally central region of the housing, thereby limiting the reforming reaction to this region. An inert filter material (such as a Ni-felt material) 7-25 is also situated adjacent the outlet 7-13, for preventing catalyst dust from leaving the housing.

In order to ensure that the hydrocarbon fuel passes through the housing 7A with a limited degree of so called "channelling" (i.e., confinement to the upper region of the unit), further traverse baffles 7-18 through 7-23 are provided in the housing. Each of the baffles 7-18 to 7-23 extends tranversely from the central baffle 7-14 and terminates at an edge member. Thus, the baffles 7-18 to 7-20 terminate at edge member 7-7 and the baffles 7-21 to 7-23 terminate at the edge member 7-8.

Furthermore, the baffles are such that the baffles 7-18, 7-20 and 7-22 abut the lower plate 7-2 and are spaced a distance from the upper plate 7-1, while the opposite holds true for the baffles 7-19, 7-21 and 7-23, i.e., each abuts the upper plate 7-1 and is spaced a distance from the lower plate. This forces the hydrocarbon fuel upward and downward as it follows the U-shaped path 7-15, thereby ensuring substantial passage of the fuel through the reforming catalyst situated in the upper and lower regions of the housing.

As is also shown in FIG. 2, a number of posts 7-24 are provided in the interior of the housing 7. These posts interact with the passing fuel causing it to become locally laterally distributed as it passes along the U-shaped path 7-15. This further promotes catalyst contact.

The posts 7-24 also extend between the upper and lower plates 7-1 and 7-2. Hence, they add structural support to the housing. Moreover, the posts 7-24 are made of conductive material, thereby facilitating electrical conductivity through the housing.

With the reforming unit housing 7A designed in the above-described manner, the housing can be arranged in the fuel cell stack 2 to obtain maximum reforming and promote a uniform temperature characteristic. This can be accomplished by situating housing 7A in a preselected manner in the stack 2 and, in particular, to have a relationship as shown in FIG. 2, with respect to the flow of cooling gas in the stack. In FIG. 2, it is assumed that cathode process gas is used as the cooling gas for the cells of the stack.

More particularly, with the FIG. 2 configuration, the fuel exit or outlet 7-13 of the housing 7A is the hottest corner of the reforming unit. This is so because the outlet is located toward the side of the reforming unit where coolant exits the adjacent fuel cells and, therefore, is the hottest. As a result, of this exit position, maximum reforming and fuel conversion of fuel to process gas occurs.

Also, the presence of the inert material 7-16 helps to promote uniform temperature. Since the fuel cells adjacent the housing 7A are coldest at the cooling gas inlet adjacent the side 7-3 of the housing 7 and since the reforming rate in the housing 7A is highest where the hydrocarbon fuel first begins the reforming reaction, if these were to occur in the same location, it would tend to promote non-uniformity in the temperature profiles of the adjacent cells. Thus, by excluding catalyst and thus reforming in the housing 7A in areas immediately adjacent the cooling gas inlet (i.e., adjacent the side 7-3) and the hydrocarbon fuel inlet 7-12, the tendency of the unit to create temperature non-uniformities is lessened. Also presence of the filter material 7-25 at the outlet 7-13 helps to prevent catalyst particulates from being blown out from the reforming bed.

In constructing the housing 7A of FIG. 2, the lower plate 7-2 and the edge members 7-7, 7-8, 7-9 and 7-11 can be formed as single assembly by machining a thick block of material to provide the desired geometry. The baffles 7-14 and 7-18 to 7-23 and posts 7-24 can then be added to the machined block and a top plate 7-1 attached to close the housing. Alternatively, the housing 7A can be formed from sheet metal for the top and bottom plates 7-1 and 7-2 and bar stock materials for the edge members. These elements and the baffles and posts can then be joined together by standard welding techniques. To prevent thermal distortion of the unit, however, brazing and/or resistance welding may be more desirable processes for joining the parts.

The housing 7A can also be formed by folding the ends of the top and bottom plates to form side walls. The side walls of the top plate would then interfit within those of the bottom plate and the unit welded. Of course the side walls would be provided with openings for the inlet 7-12 and outlet 17-13 and the baffles and posts added before the unit is closed and welded. With this type of formation for the housing 7A, the edge members need not be used.

As a further alternate configuration, the baffles 7-18 to 7-23 and the posts 7-24 of the unit 7 can be replaced with various forms of plates which themselves provide the support function, electrical contact function and gas distribution function. FIG. 6 shows one form of fin type plate 81 which can be used for this purpose and which can house elongated catalyst pellets 82 if desired. In this case, the plate 81 has an undulating or corrugated plate section 81-A which has peak and valley parts 101 and 102. The section 81-A is followed in its x or length direction by a similar undulating or corrugated plate section 81-B also having peak and valley parts 101 and 102. The section 81-B is, however, offset from the section 81-A by an amount t in a y direction which is transverse to the length direction x. Each peak segment of the sections 81-A and 81-B contains a number of cylindrical catalyst pellets, show as three pellets 82A, 82B and 82C.

FIG. 7 shows a second plate configuration 91. This plate configuration also has undulating or corrugated plate sections 91-A, 91-B, 91-C, 91-D . . . which follow each other in the x or length direction. Each of these sections has peak and valley parts 103 and 104. Each section, furthermore, is offset an amount o in the y direction from its preceding section with the offset alternating in sense for successive sections. Each peak part of a section houses a catalyst pellet 82D.

Catalyst for the housing 7A may be introduced into the housing in a variety of ways after the unit has been constructed or during its construction. The catalyst can be introduced in either a dry or slurry form.

In order to properly arrange each reforming unit assembly 7 into the stack 2, each reforming unit must be provided with a mechanism for integrating the housing 7A of the unit with the components of its adjacent fuel cells. Since each fuel cell 2-A-2-K has anode components on one side and cathode components on the other side of the cell, each housing 7A of each unit 7 will abut anode components on one of its surfaces and cathode components on the other of its surfaces. In accordance with the principles of the present invention, an integrating unit is provided for integrating each reforming unit housing 7A with these components in a way which promotes the desired isolation of the cathode components from the hydrogen process gas being generated in the housing 7A.

Figure 3:
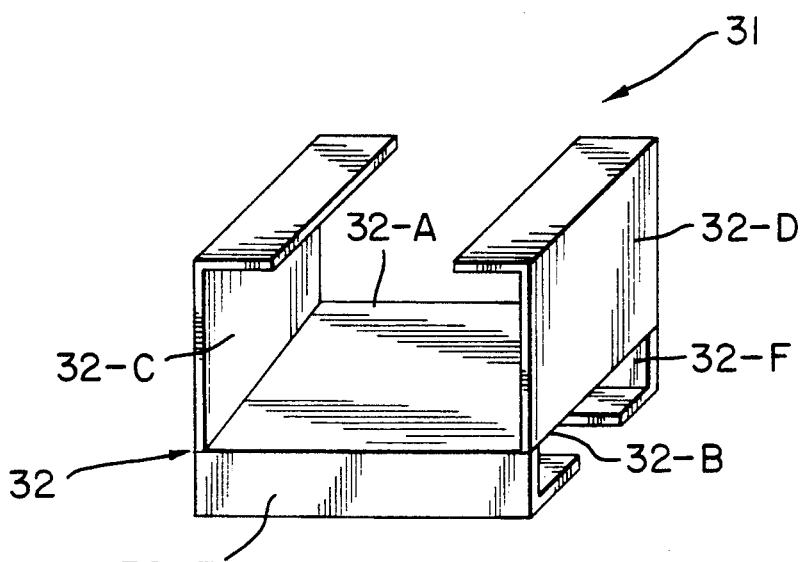
FIG. 3 shows an integrating plate of a reforming unit assembly of FIG. 1.
Figure 4:
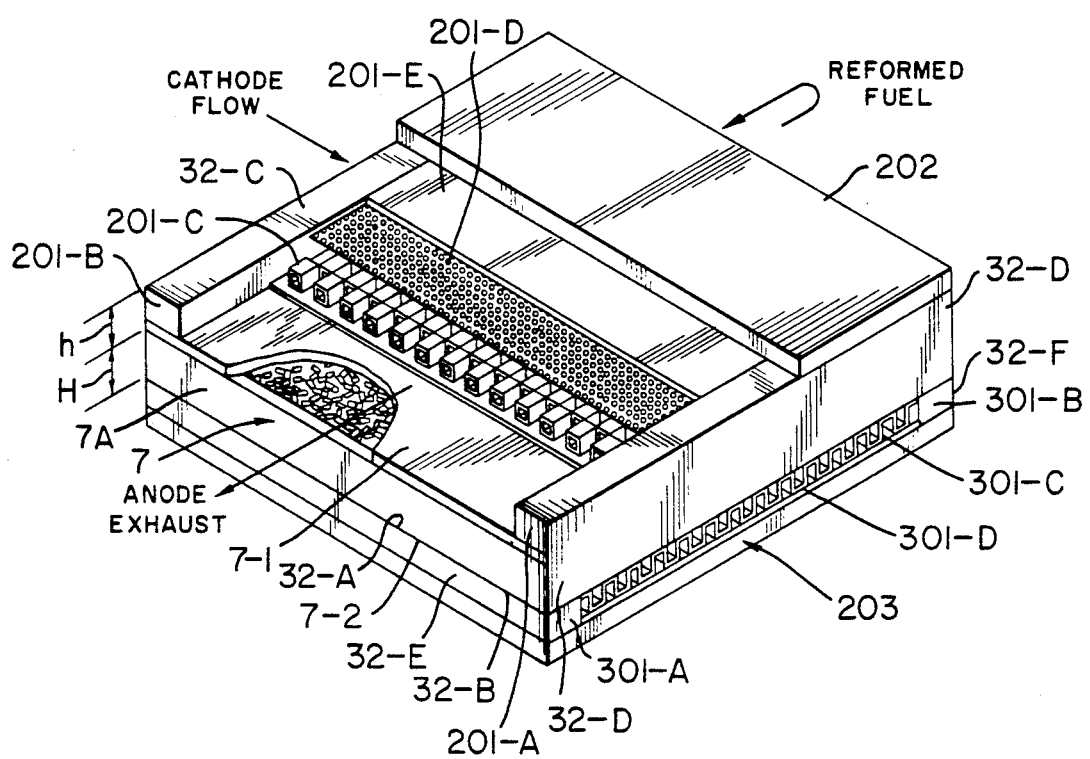
FIG. 4 shows the integrating plate of FIG. 3 used to integrate the reforming unit housing of FIG. 2 with its adjacent fuel cells.

FIGS. 3 and 4 show an integrating unit 31 of this type. As shown, the unit comprises a flat plate 32 having upper and lower surfaces 32-A and 32-B, a set of upwardly folded opposing edges 32-C, 32-D and a set of downwardly folded opposing edges 32-E, 32-F.

As can be seen in FIG. 4, the upper surface 32-A of the plate 32 abuts the lower surface 7-2 of reforming unit housing 7A whose upper surface 7-1, in turn, abuts the anode components of the adjacent cell. These components include anode side rails 201-A, 201-B, anode corrugated current collector 201-C, anode performed current collector 201-D and anode electrode 201-E. The latter three components are stacked one on the other and situated between the side rails 201-A and 201-B.

The folded edges 32-C and 32-D of the plate 32 are of sufficient height t accomodate the height H of the reforming unit housing 7A and the height h of the abutting rails 201-A or 201-B, respectively. These edges, furthermore, extend inwardly to overlap and cover the length of their respective rail. The fuel cell matrix 202, in turn, rests on the inwardly extending portions of the folded edges.

Abutting the lower surface 32-B of the plate 32 are the cathode components of another adjacent cell. Thus, cathode side rails 301-A, 301-B abut the edges of the surface 32-B. Between the rails 301-A, 301-B, the cathode CCC 301-C and the cathode electrode 301-D are situated in stacked relationship. In this case, the folded edges 32-E and 32-F accomodate the height h of the rails and again bend inwardly to overlap the length of the rails. The matrix 203 of this adjacent cell then abuts these overlapped ends.

With assembly 31 designed as above, the assembly isolates the reforming housing 7A from the adjacent cathode components and any leakage of reformed gases is safely directed to the anode components. These can be better appreciated from FIG. 5 which shows a cross section through the assembly of FIG. 4. As can be readily seen in FIG. 5, the flat central area of the surface 32-A of the plate 32 and the folded edges 32-C and 32-D of the plate form a shroud around the reforming unit housing 7A on the side of the anode components. This causes any escaping gases to be kept on the anode side of the unit and away from the cathode side.

Figure 5:
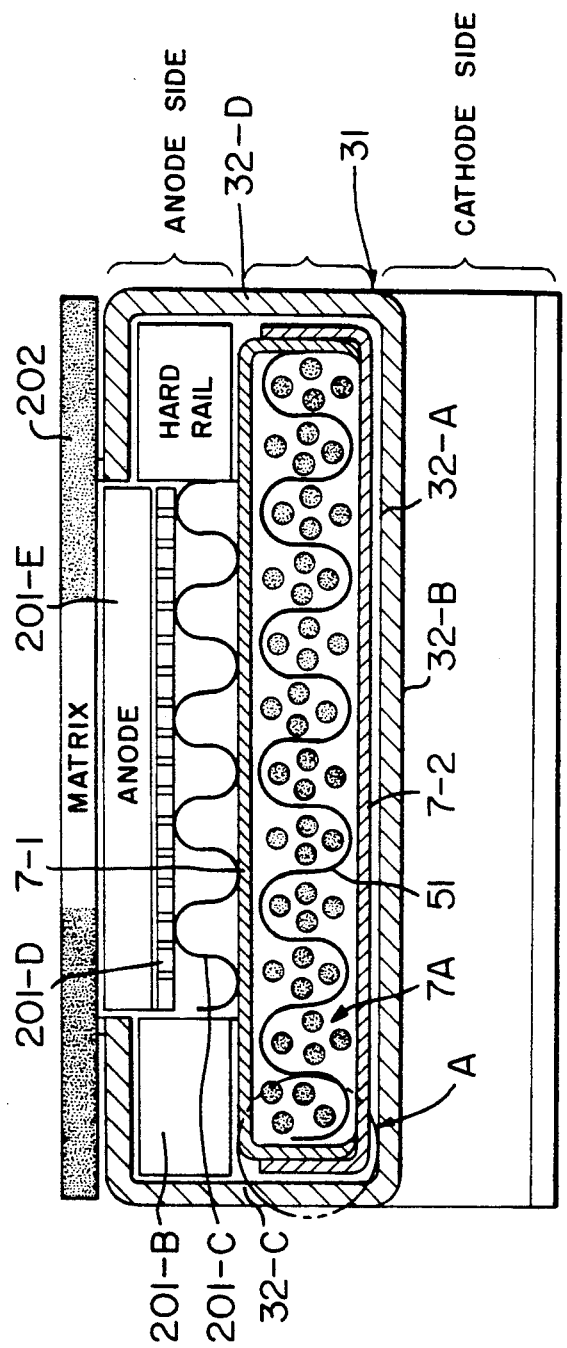
FIG. 5 shows a cross-section through a portion of the integrated arrangement of FIG. 4.
Figure 5A:
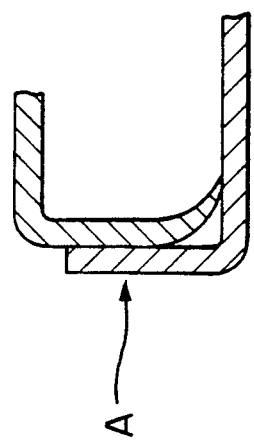
FIG. 5A shows an enlargement of the sealing arrangement between the sides of the reforming unit housing shown in FIG. 5.

In the FIG. 5 illustration, the upper and lower plates 7-1 and 7-2 of the reforming unit housing 7A are shown as having folded sides, with the upper plate sides interfitting within the lower plate sides to close the unit. Because of the isolation provided by the integrating unit 31, the sides of the reforming unit may be sealed simply by the compression force exerted on the stack. This is shown in FIG. 5A which depicts in exploded view the encircled region, identify as A in FIG. 5. As a result, welding of the sides becomes unnecessary and the integrity of the housing 7A is not compromised by possible warping which might result from welding.

In the FIG. 5 arrangement, as was discussed above, plate structure 51 is used within the housing 7A. This structure provides distribution of the hydrocarbon fuel, electrical contact and support between the upper and lower plates of the unit.

Figure 8:
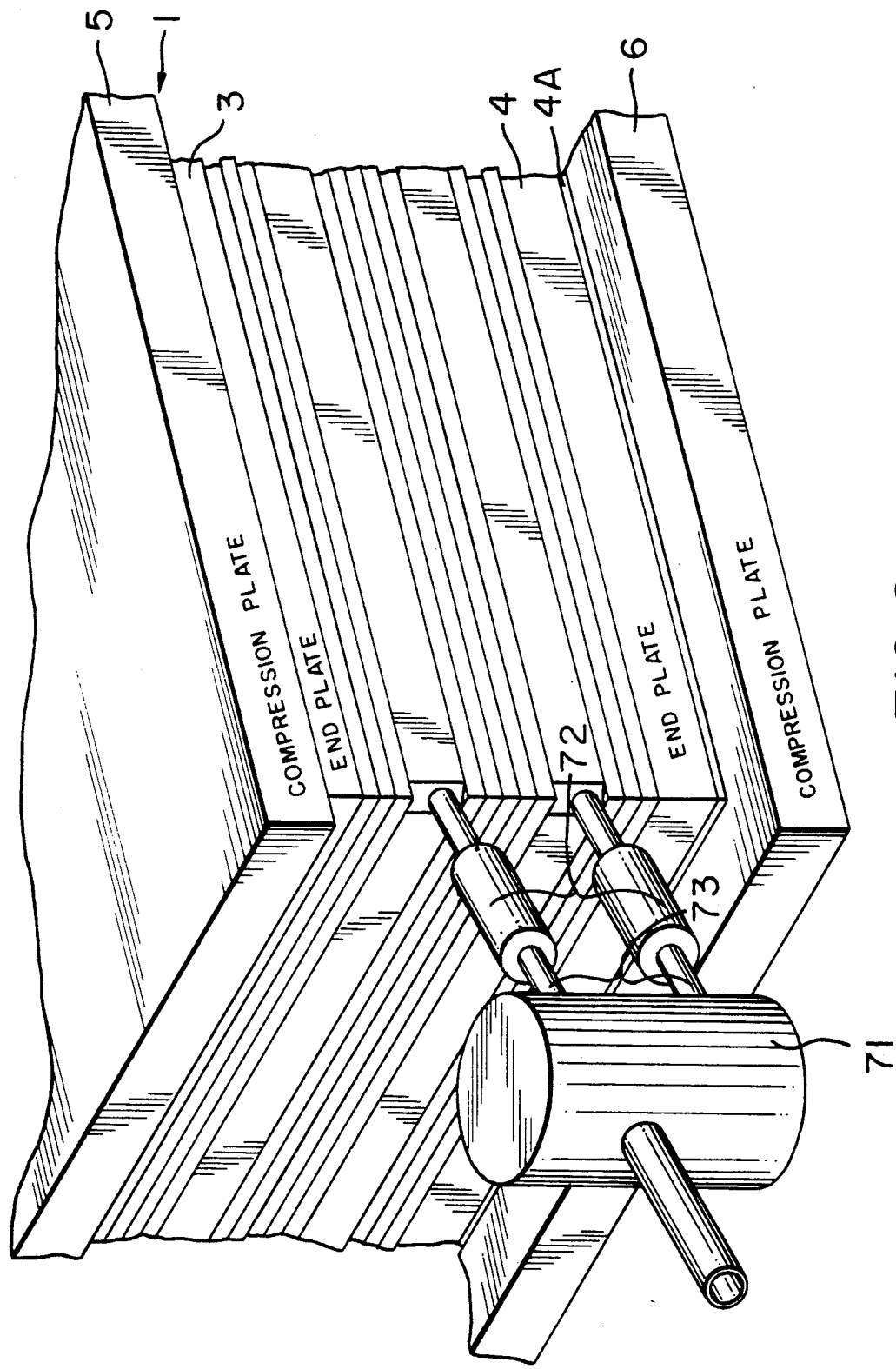
FIG. 8 shows a partial isometric view of the stack of FIG. 1 with a fuel feed assembly.

FIG. 8 shows an isometric partial view of the stack of FIG. 1. As can be seen in this figure, the hydrocarbon fuel is fed from a supply 71 through feed lines 73 containing dielectric breaks 72. The latter, in turn, feed the reforming units 7 through the inlets 7-12, which as above-described, are at the corners of the units. With this configuration electrical isolation is maintained between the hydrocarbon fuel supply components and the reforming units. Also, these components are situated so as not to interfere with the manifolding needed to supply the fuel cells 2-A-2-K.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus comprising:
   a plurality of fuel cells arranged in a stack;
   a reforming unit for use in reforming hydrocarbon fuel to produce hydrogen fuel gas for said fuel cells, said reforming unit being disposed in said stack between first and second fuel cells and comprising: a housing having an inlet for receiving hydrocarbon fuel and an outlet for outputting said hydrogen fuel gas, said housing also having a first surface facing said first fuel cell and a second surface facing said second fuel cell;
   said first fuel cell including: opposing first and second anode side rails situated on the side of said first surface of said housing;
   said second fuel cell including: first and second cathode side rails situated on the side of said second surface of said housing;
   and said reforming unit further including: a plate having opposing first and second surfaces for integrating said reforming unit with said first and second fuel cells, the second surface of the housing abutting the first surface of said plate and said anode side rails abutting opposite edges of the second surface of said housing, opposite first ends of said plate extending outwardly of the plane of said plate to the extent of the height of said housing and the associated abutting anode side rails and then inwardly in overlapping relationship to such associated anode side rails, the cathode side rails abutting the edges of the second surface of said plate, opposite second ends of said plate extending outwardly of the plane of said plate in the opposite direction to said first ends to the extent of the height of the associated cathode side rails and then inwardly in overlapping relationship to such associated cathode side rails.

2. Apparatus in accordance with claim 1 wherein:
   said housing includes first and second plates whose ends are bent to form sidewalls for said housing, the bent ends of one of said plates abutting the bent ends of the other of said plates to form a seal as a result of the compression exerted by said stack.

3. Apparatus in accordance with claim 1 wherein:
   said housing includes means within said housing to cause said hydrocarbon fuel to follow a generally U-shaped path in passing through said housing from said inlet to said outlet.

4. Apparatus in accordance with claim 1 wherein:
   said housing includes means for causing said hydrocarbon fuel to move in directions transverse to the path generally being followed by said hydrocarbon fuel.

5. Apparatus in accordance with claim 1 wherein:
   said catalyst is situated in preselected areas within said housing.

6. Apparatus in accordance with claim 5 wherein:
   said catalyst is situated within said housing so as to be substantially outside the regions of said housing in the immediate vicinity of said inlet.

7. Apparatus in accordance with claim 5 wherein:
   said catalyst is situated within said housing so as to be substantially outside the regions of said housing which are to be in the immediate vicinity of the cooling gas inlets of adjacent fuel cell components.

8. Apparatus in accordance with claim 1 wherein:
   said housing includes means within said housing to promote electrical conductivity of said housing.

9. Apparatus in accordance with claim 1 wherein:
   said housing further includes means within said housing to provide support for the housing.

10. Apparatus in accordance with claim 1 wherein:
    said housing has upper and lower surfaces and a sidewall connecting said upper and lower surfaces.

11. Apparatus in accordance with claim 10 wherein:
    said housing includes means for causing said hydrocarbon fuel to travel a generally U-shaped path in passing through said housing from said inlet to said outlet, said means including: a baffle extending between said upper and lower surfaces from a first region of said sidewall into the interior of said housing.

12. Apparatus unit in accordance with claim 11 wherein:
    said sidewall includes first and second opposing sidewall sections, a third sidewall section joining a first pair of opposing ends of said first and second sidewall sections and a fourth sidewall section opposing said third sidewall section and joining a second set of opposing ends of said first and second sidewall sections.

13. Apparatus in accordance with claim 12 wherein:
    said inlet is at the intersection of said first and third sidewalls sections;
    said baffle extends from said first sidewall section in the direction of said second sidewall section;
    and said outlet is in said first sidewall section between the point of intersection with said baffle and the point of intersection of said first sidewall section and said fourth sidewall section.

14. Apparatus in accordance with claim 13 wherein:

said housing includes inert material disposed in said housing along said inlet and along said third sidewall section.

15. Apparatus in accordance with claim 1 further comprising:
   plate structure within said housing adapted to distribute said hydrocarbon fuel as said hydrocarbon fuel traverses said housing, to provide support to said housing and to provide electrical conductivity through said housing.

16. Apparatus in accordance with claim 15 wherein:
said plate structure comprises a corrugated plate having staggered sections.

17. Apparatus in accordance with claim 1 further comprising:
a supply line for coupling fuel from a supply to said inlet, said supply line including dielectric break means in said line.

18. Apparatus in accordance with claim 1 wherein:
said inlet is situated at a corner of said housing.

19. Apparatus in accordance with claim 1 wherein:
said fuel cells are molten carbonate fuel cells.

20. Apparatus in accordance with claim 1 wherein:
said housing further includes means located at said outlet for preventing catalyst particulates from leaving said housing.

21. Apparatus in accordance with claim 20 wherein:
said means for preventing comprises a felt material.

22. Apparatus in accordance with claim 21 wherein:
said felt material comprises nickel.

* * * * *

UNITED STATES PATENT AND TRADEMARK OFFICE
CERTIFICATE OF CORRECTION

PATENT NO. : 5,175,062
DATED : December 29, 1992
INVENTOR(S) : Mohammad Farooque, et al.

It is certified that error appears in the above-identified patent and that said Letters Patent is hereby corrected as shown below:

Col. 3, line 60.  Change "a" to -- an --
Col. 6, line 34.  After "collector" insert -- (CCC) --
Col. 6, line 34.  Change "performed" to -- perforated --
Col. 6, line 35.  After "collector" insert -- (PCC) --
Col. 6, line 40.  Change "t" to -- to --
Col. 7, line 9.   Change "identify" to -- identified --
Col. 8, line 61.  Change "sidewalls" to -- sidewall --

Signed and Sealed this

Nineteenth Day of October, 1993

BRUCE LEHMAN

Attest:

Attesting Officer

Commissioner of Patents and Trademarks